United States Patent
Bierewirtz et al.

(10) Patent No.: US 9,752,461 B2
(45) Date of Patent: Sep. 5, 2017

(54) STEAM POWER PLANT WITH A SECOND LOW-PRESSURE TURBINE AND AN ADDITIONAL CONDENSING SYSTEM

(71) Applicant: ALSTOM Technology Ltd, Baden (CH)

(72) Inventors: Fabian Bierewirtz, Mannheim (DE); Volker Schüle, Leimen (DE); Hermann Seelinger, Lampertheim (DE)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 14/158,989

(22) Filed: Jan. 20, 2014

(65) Prior Publication Data

US 2014/0216035 A1    Aug. 7, 2014

(30) Foreign Application Priority Data

Feb. 5, 2013  (EP) .................................. 13153986

(51) Int. Cl.
| | |
|---|---|
| *F28B 7/00* | (2006.01) |
| *F28B 3/00* | (2006.01) |
| *F01K 9/00* | (2006.01) |
| *F01K 23/10* | (2006.01) |
| *F01K 25/08* | (2006.01) |
| *F01K 13/02* | (2006.01) |
| *F01K 11/02* | (2006.01) |

(Continued)

(52) U.S. Cl.
CPC ................. *F01K 11/02* (2013.01); *F01K 7/22* (2013.01); *F01K 7/40* (2013.01); *F01K 9/00* (2013.01); *F01K 9/003* (2013.01); *F01K 13/02* (2013.01); *F01K 23/10* (2013.01); *F01K 25/08* (2013.01); *F28B 3/00* (2013.01); *F28B 7/00* (2013.01); *Y02E 20/14* (2013.01); *Y02E 20/16* (2013.01)

(58) Field of Classification Search
CPC ...... F28B 7/00; F28B 3/00; F01K 9/00; F01K 23/10; F01K 25/08; F01K 9/003; F01K 13/02; F01K 11/02; F01K 7/22; F01K 7/40; Y02E 20/16; Y02E 20/14
USPC .......................................................... 60/693
See application file for complete search history.

(56) References Cited

U.S. PATENT DOCUMENTS

| | | | |
|---|---|---|---|
| 3,873,817 A * | 3/1975 | Liang | ...................... F01D 21/00 376/211 |
| 3,878,273 A * | 4/1975 | Anderson | ...................... 261/151 |
| 3,973,404 A | 8/1976 | Iizuka et al. | |

(Continued)

FOREIGN PATENT DOCUMENTS

| | | |
|---|---|---|
| CA | 848773 | 8/1970 |
| CH | 307094 | 5/1955 |

(Continued)

*Primary Examiner* — Mark Laurenzi
*Assistant Examiner* — Wesley Harris
(74) *Attorney, Agent, or Firm* — GE Global Patent Operation; Cynthia W. Flanigan

(57) ABSTRACT

A steam power plant with a low-pressure turbine is suggested with a second low-pressure turbine on a separated shaft line including a separate generator. The second low-pressure turbine is connected to an additional condensing system without cooling water consumption, thus allowing to maintain the power output at a high level, even if the main condensing system has a reduced capacity due to cooling water restrictions.

10 Claims, 4 Drawing Sheets

(51) Int. Cl.
*F01K 7/22* (2006.01)
*F01K 7/40* (2006.01)

(56) References Cited

U.S. PATENT DOCUMENTS

| | | | |
|---|---|---|---|
| 5,749,228 A * | 5/1998 | Shiga et al. | 60/679 |
| 5,779,435 A | 7/1998 | Lageder et al. | |
| 6,244,035 B1 | 6/2001 | Krill | |
| 2005/0063821 A1 | 3/2005 | Luniewski et al. | |
| 2009/0136337 A1 * | 5/2009 | Boss et al. | 415/145 |
| 2010/0287935 A1 | 11/2010 | Smith | |
| 2011/0203279 A1 * | 8/2011 | Duong | F01K 9/00 60/670 |
| 2012/0099974 A1 * | 4/2012 | Wolf | F01K 9/003 415/178 |
| 2012/0210874 A1 | 8/2012 | Iijima | |

FOREIGN PATENT DOCUMENTS

| | | |
|---|---|---|
| EP | 0 491 988 | 4/1991 |
| EP | 1 666 699 | 6/2006 |
| EP | 2 305 364 | 4/2011 |
| EP | 2 372 111 | 10/2011 |
| GB | 105933 | 5/1917 |
| JP | 11093615 | 4/1996 |
| WO | 99/20874 | 4/1999 |
| WO | 2009/037516 | 3/2009 |

* cited by examiner

STEAM POWER PLANT WITH A SECOND LOW-PRESSURE TURBINE AND AN ADDITIONAL CONDENSING SYSTEM

CROSS-REFERENCE TO RELATED APPLICATIONS

This application claims priority to European application 13153986.8 filed Feb. 5, 2013, the content of which is relied upon and incorporated herein by reference in its entirety.

TECHNICAL FIELD

The claimed invention is related to a steam power plant including at least one steam turbine connected to a (main) condensing system.

BACKGROUND

Steam power plants comprise one or more steam turbines, also referred to as "units". Each unit comprises a high-pressure turbine, an intermediate-pressure turbine and a low-pressure turbine. The expanded steam is conducted by a steam exhaust from the low-pressure turbine to a condenser. The condenser is connected to a cooling system, for example a wet cooling tower. Wet cooling towers have a great cooling performance, but require cooling water.

In case that the power plant comprises more than one turbine in most cases the exhaust of all turbines is connected to one main condensing system. This layout is appropriate if sufficient cooling water for condensing the steam is available.

Today there is a growing need to adapt the operating regime of existing power plants to changing boundary conditions, resulting from e.g. climate change or environmental restrictions. Especially seasonal restricted water supply and a shortage in cooling water make-up resulting thereof, has led for power plants to forced load reductions.

Consequently, it is an object of the claimed invention to provide a steam power plant with a reduced dependency of the electrical output from the available cooling water resources.

In other words: the steam power plant according to the invention should be able to maintain a high electricity output, even if the cooling capacity of the regular condenser is reduced due to temporary shortage of cooling water.

A further object of the invention is to reduce the cooling water consumption of the power plant.

These objectives are achieved by means of a steam power plant with at least one steam turbine comprising a low-pressure turbine and a main condensing system, by adding a second low-pressure turbine and a second condensing system, which is preferably an air cooled condenser (ACC).

SUMMARY

In case of cooling water shortage, at least a part of the steam from the intermediate-pressure turbine can be conducted to the second low-pressure turbine and after having been expanded being condensed in the second condensing system. As a result even if the cooling capacity of the main condensing system is not sufficient because of insufficient flow of make-up water, the second condensing system is able to handle the enthalpy flow when the power output shall not be reduced.

Shall the existing system be off loaded with a second heat sink, which is independent from water availability, the system would need to be operated at a higher low pressure turbine back pressure to be able to balance in parallel a wet and a dry cooling system. Since the second heat sink is decoupled from the main condensing and cooling system in this arrangement, the second heat sink can be designed and operated at a different, presumably higher, pressure than the main heat sink.

This arrangement improves the operation flexibility of the steam power plant, since, if the ambient temperature is low enough and only a small amount of cooling water is available, the second low-pressure turbine and the second condensing system can be activated and consequently the electricity output of the steam power plant is reduced only a bit, even though the power plant is short of cooling water.

A preferred embodiment of the claimed invention the second condensing system is of non-evaporative cooling and/or once through cooling type to achieve a high cooling performance, without additional cooling water consumption.

The claimed second low pressure turbine may be connected to the turbine by means of a branch piece in the overflow pipe between the intermediate pressure turbine and the first low pressure turbine. To be able to control the flow of steam into the first low pressure turbine and/or the second low pressure turbine a first control valve is installed between the branch piece and the first low pressure turbine. Further on, a second control valve is installed between the branch piece and the second low pressure turbine.

Of course other designs are possible that allow the control of steam flow through the first low pressure turbine and/or the second low pressure turbine.

To be able to control the cooling performance of the second condensing system the second condensing system comprises a fan, preferably a variable speed fan. A variable speed fan enables to control the cooling performance of the second condensing system combined with a minimal energy consumption of the fan.

In a preferred embodiment of a steam power plant with several turbines or units each comprising a high pressure turbine, an intermediate pressure turbine and a low pressure turbine and all of them being connected to the main condensing system.

At least one of these turbines comprise a second low-pressure turbine and a second condensing system. This design allows to supply all turbines except the one with the second low pressure turbine, with cooling capacities from the main condensing system and only one turbine, that has to be equipped with a second condensing system.

This means, that the additional installation are rather low, since only one low-pressure turbine and one second condensing system is required for the whole power plant and the electric output of the power plant may be maintained at a high level, even if there is a shortage of cooling water.

An exemplary embodiment of the invention is explained in the drawings and their description.

DETAILED DESCRIPTION

Figure 1:
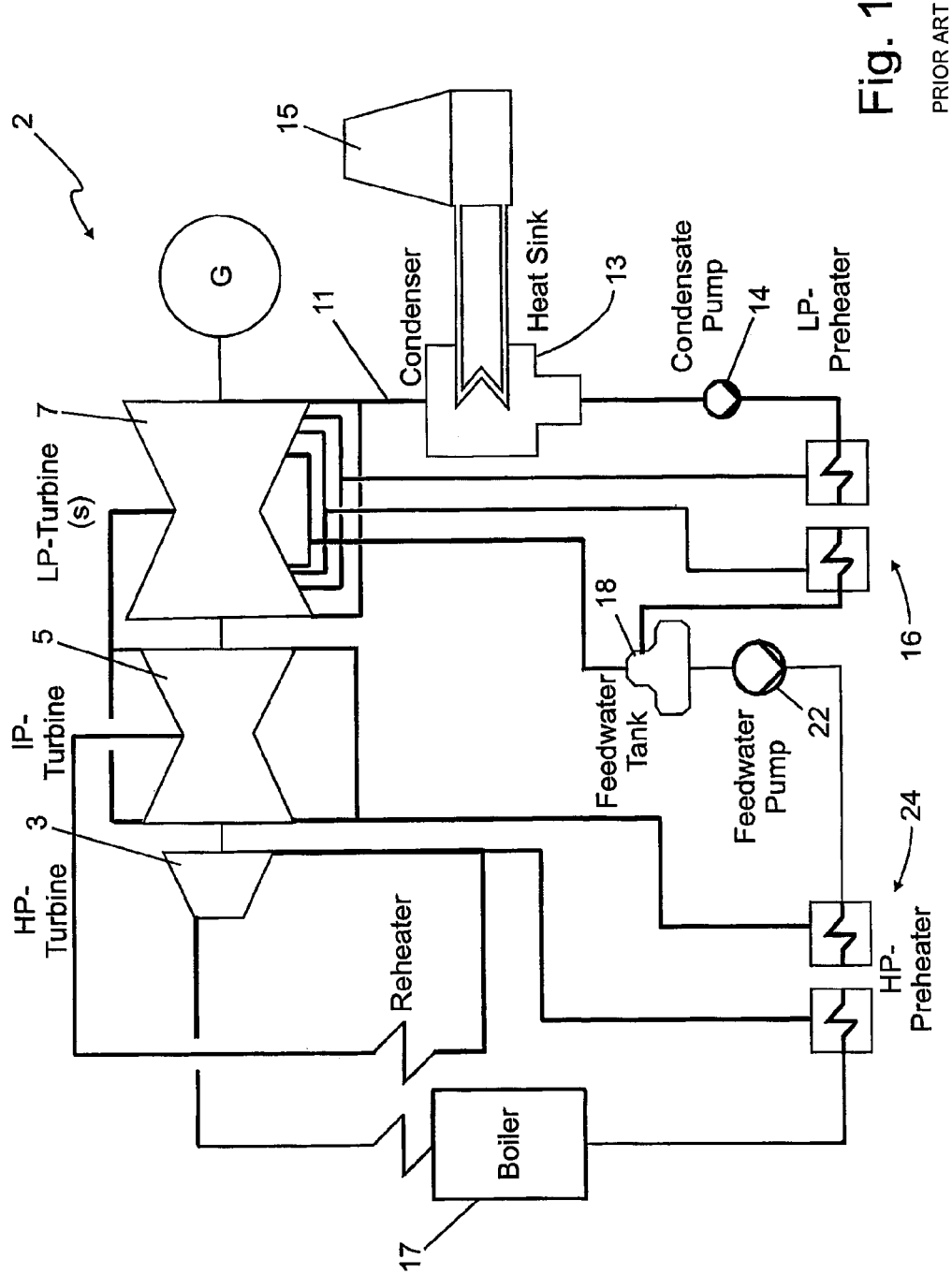
FIG. 1 is a conventional steam power plant with three or more steam turbines.

FIG. 1 is a schematic illustration of a conventional steam turbine 1.1. In this exemplary embodiment, the steam turbine 1 is of the multi-pressure single-shaft type and comprises a high-pressure turbine 3, an intermediate-pressure turbine 5, a low-pressure turbine 7 and a generator G.

The low-pressure steam turbine 7 is supplied with steam by an overflow pipe 9. This overflow pipe 9 connects the intermediate pressure turbine with the low-pressure steam turbine 7. An exhaust 11 connects the low-pressure steam turbine 7 with the main condensing system 13. After expansion of the steam in the low-pressure turbine 7 the steam enters the condenser 13 with a pressure of approximately 0.03 bar to 0.1 bar. The main condensing system 13 may be of the surface condenser-type that is connected with a wet cooling system 15, for example a natural or mechanical draught cooling tower. Downstream of the main condensing system 13 is a condensate pump 14 that delivers the condensed steam to a low pressure preheating train 16 and the feed water tank 18.

After or downstream the feed water tank 18 a further feed water pump 22 is increasing the pressure of the condensate (from here on called feed water) to the required level and pumps the feed water through the high pressure preheaters 24 into the boiler 17.

Large Power Stations or power plants comprise several of the described Rankine cycle processes (or turbines 1); each process with its own boiler and heat sink. In this exemplary description the Power Station is assumed to consist of three units. Of course, other numbers of units are possible, too.

Figures 2A, 2B:
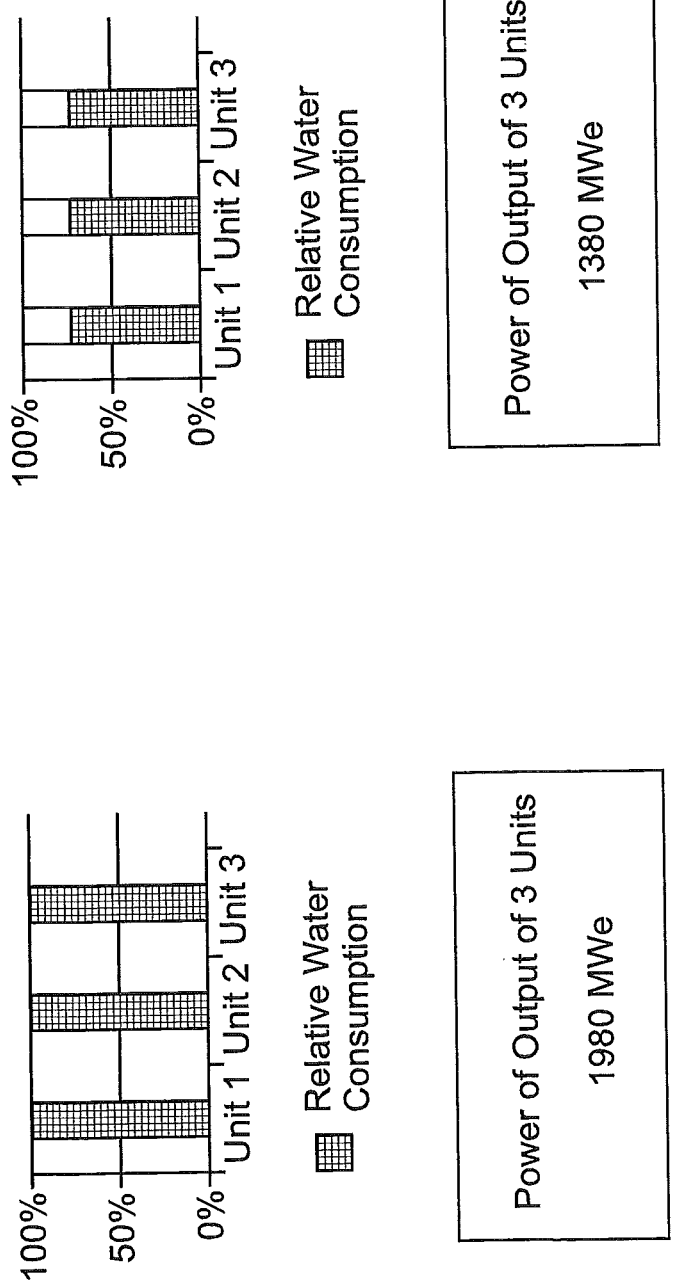
FIGS. 2a and 2b provide two chart diagrams illustrating the reduction of power output due to cooling water shortage.

FIG. 2a shows a bar chart of a power plant with three units 1, 2 and 3 with the same arrangement and capacity. Each of the units is connected to an individual heat sink, which is assumed to be a wet evaporative cooling system, for example a natural or mechanical draught cooling tower.

FIG. 2a illustrates the case that there is enough cooling water available and the units 1, 2 and 3 operate at full load, resulting in an output of 1980 MWelectric of the three units 1, 2 and 3.

FIG. 2b illustrates the case that there is not enough cooling water available and the units 1, 2 and 3 are connected to the main cooling systems 15. Since the main cooling systems 15 operate at reduced load due to shortage of cooling water, the electrical output of the units 1, 2 and 3 is only 1380 MWelectric, which is a reduction of more than 25% compared to 1980 MWelectric in case of sufficient cooling water.

Figure 3:
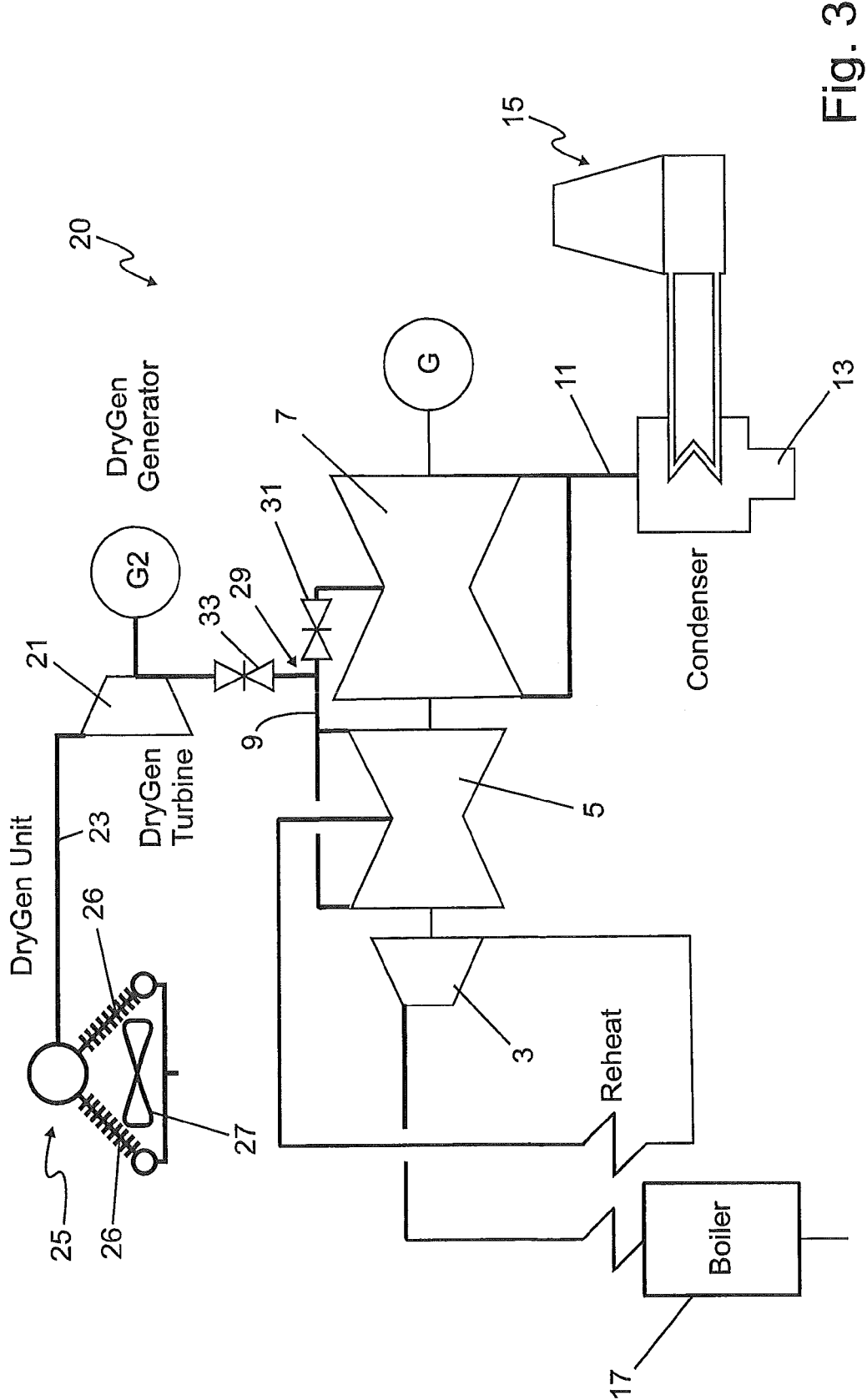
FIG. 3 is a steam turbine with two low-pressure turbines and a second cooling system.

In FIG. 3 a steam turbine 20 according to the invention is illustrated. The steam turbine 20 comprises in addition to the (first) low-pressure turbine 7 a second low-pressure turbine 21 and a second generator G2.

Not shown in FIG. 3 are the condensate pump 14, the low pressure preheating train 16, the feed water tank 18, the feed water pump 22 and the high pressure preheaters 24, that are similar to the ones explained in conjunction with FIG. 1.

The exhaust of the low pressure turbine 21, which can be a single or double flow turbine with axial or radial exhaust, is connected to an air cooled condenser 25. The second condenser 25 usually comprises a fan 27 forcing ambient air through air-steam heat exchanger elements 26 thus condensing the low-pressure steam of the second low-pressure steam turbine 21 without any cooling water consumption.

The fan 27 comprises is preferably a variable speed drive, allowing to control the cooling performance and the resulting consumption of electric energy to an economic and/or thermodynamic optimum.

The overflow pipe 9 comprises a branch piece 29 conducting the steam from the intermediate-pressure turbine 5 to either the first low-pressure turbine 7 or the second low-pressure turbine 21.

Between the branch piece 29 and the first low-pressure turbine 7 the overflow pipe 9 comprises a first control valve 31. Between the branch piece 29 and the second low-pressure turbine 21 the overflow pipe 9 comprises a second control valve 33. The control valves 31, 33 allow to control the amount of steam entering the first and the second low-pressure turbine 7 and 21.

Since the second low-pressure turbine 21 and the second generator G2 are connected with the turbine 20 only by means of the overflow pipe, the performance, number of revolutions and other characteristics of the second low-pressure turbine 21 and the second generator G2 may be designed independent from the first low-pressure turbine 7 resulting in an optimized behavior and efficiency of the second low-pressure turbine 21, the second generator G2 and the second condensing system 25.

In case a steam power plant comprises more than one unit, in most cases it is sufficient to equip one unit with a turbine 20 comprising a second low-pressure turbine 21, a second generator G2 and a second condenser 25. The other units may be equipped as illustrated in FIG. 1.

This results in reduced the overall costs for the power plant and notwithstanding the positive effects of the additional equipment.

Figure 4:
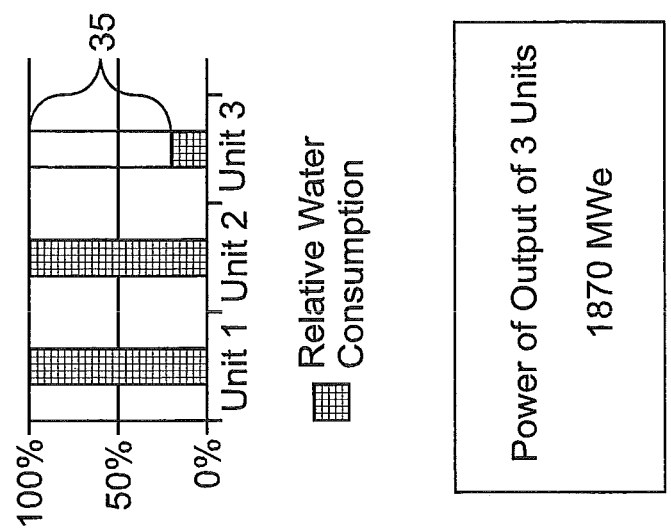
FIG. 4 is a chart diagram illustrating the power output of the claimed steam power plant in case of cooling water shortage.

These positive effects are subsequently explained exemplary in conjunction with FIG. 4. FIG. 4 shows a bar chart of a power plant comprising three units 1, 2, and 3. The units 1 and 2 may be equipped with a turbine 1 as illustrated in FIG. 1. The unit 3 is be equipped with a turbine 20 as illustrated and explained in conjunction with FIG. 3.

To allow a comparison of the claimed invention with a prior art steam power plant it is assumed that the units 1, 2 and 3 of FIG. 4 have to be operated under the same circumstances (water shortage) as the units 1, 2, and 3 of FIG. 2b.

Looking now to FIG. 4 it can be seen that the available cooling water is distributed to the units in a different way:

The units 1 and 2 are completely supplied with the cooling water they need and the rest of the available cooling water is delivered to unit 3.

The residual cooling demand 35 is delivered by the second condenser 25 of the second low-pressure turbine 21. This means that all three units 1, 2, and 3 may be operated at full load.

Since the second LP turbine 21 has a higher backpressure, due to the air cooled heat sink, the power output of unit 3 is lower than if it were operated a fully wet cooled LP-turbine 7. Furthermore an increased parasitic electricity consumption is added to the balance of the power plant by means of fans 27 for the air cooling equipment and pumps in the condensate system. The net electric power output of 1870 Mwe of the turbines units 1, 2, and 3 is reduced compared to the electric power output of 1980 Mwe of the units 1, 2 and 3 with no cooling water restrictions.

But the electric power output is some 45% percent above the electric power output of the prior art power plant with the units 1, 2 and 3 with cooling water shortage (c. f. the power output of FIGS. 2b and 4).

In other words: a steam power plant according to the invention, may keep its electric output at a high level, even if cooling water is short.

Since the only connection between the second low-pressure steam turbine 21 and the additional condensing system 25 and the steam power plant is the overflow pipe 9, merely no restrictions with regard to space available and the place where the second low-pressure turbine 21 and the second condenser 25 are located exist.

This means that the claimed invention can be realized even under difficult conditions, as far as the available space is concerned. The claimed invention is well suited as a retrofit or upgrading of existing steam power plants. This means that the claimed invention can be realized not only in new designs of low-pressure steam turbines, but is a retrofit-solution for existing steam power plants, that may lead to an equal or improved electricity output, even if the capacity of the main condensing system is reduced due to cooling water restrictions.

The flexibility of the claimed invention is rather high for the following reasons:

The back pressure, to which the additional heat sink shall be connected, will be designed considering requirements of the individual power station.

With the load reduction of the existing condenser, it is also possible to maximize the power output with a limited consumption of cooling water make up.

When the target is to reduce the cooling water consumption, the additional cooling system will be of non-evaporating type. The main benefit in this context is, that an additional condensing system would allow to override existing load restrictions for a certain cooling water consumption.

The described solution maintains, or even improves the operation flexibility of the plant. The additional low-pressure turbine 21 and condensing system 25 can be taken out of service without compromising the plant performance compared to the status prior to the modification.

E.g. when sufficient make-up water for the main condensing system is available, the additional condensing system could be taken out of service and the plant would return to its original operating parameters.

In case the first LP-turbine 20 should be chocked or not sufficient condensing capacity should be available, the total MW output level could even be increased when more condensing capacity is made available.

The second LP turbine 21, to which the additional heat sink is connected, can be designed to optimize the exhaust pressure for dry cooling equipment, since the required heat exchanger surface is reduced with higher extraction pressure.

The condenser technology of the additional condensing system 25 can follow all possible functional principles but will almost certainly have to have a non-evaporative heat sink, when the purpose is to reduce the cooling water consumption.

The additional condensing system 25 could be placed in any location, but preferably close to the LP-turbine 21 to keep pressure losses in the steam ducts low.

The condensate as it is produced in the additional condensing system 25, will be fed back into the existing water steam cycle at the appropriate tapping point.

As shown in FIG. 3 and explained above the claim includes the installation of any kind of additional heat sink to the second low-pressure turbine 21 (exhaust or extraction), e.g. evaporative-, non-evaporative cooling, once through cooling, etc. with the appropriate condenser, e.g. surface tube condenser, jet condenser, air cooled condenser, etc.

The invention claimed is:

1. A steam power plant, comprising:
   a first low-pressure turbine;
   a wet condensing system fluidly connected to the low-pressure turbine configured to directly receive and cool an entire exhaust gas from the first low-pressure turbine;
   a second low-pressure turbine; and
   a dry condensing system fluidly connected downstream of the second low-pressure turbine configured to directly receive and cool an entire exhaust gas from the second low-pressure turbine;
   a first steam valve fluidly connected upstream of the first low-pressure turbine; and
   a second steam valve fluidly connected upstream of the second low-pressure turbine.

2. The steam power plant according to claim 1, wherein the dry condensing system is of non-evaporative cooling and/or once through cooling type.

3. The steam power plant according to claim 1, comprising: a high-pressure turbine and an intermediate-pressure turbine wherein the intermediate-pressure turbine and the first low-pressure turbine are connected by an overflow pipe.

4. The steam power plant according to claim 3, wherein the second low-pressure turbine is connected to the overflow pipe.

5. The steam power plant according to claim 4, wherein the overflow pipe comprises a branch piece which connects the overflow pipe to the second low-pressure turbine.

6. The steam power plant according to claim 5, wherein the first steam valve is installed between the branch piece and the first low-pressure turbine.

7. The steam power plant according to claim 5, wherein the second steam valve is installed between the branch piece and the second low-pressure turbine.

8. The steam power plant according to claim 1, wherein the dry condensing system comprises a fan.

9. A method for operating a steam power plant, the method comprising
   providing a first portion of an exhaust gas to a first low-pressure turbine;
   providing a second portion of the exhaust gas to a second low-pressure turbine;
   directly cooling an entire exhaust gas from the first low-pressure turbine by a wet condensing system; and
   directly cooling an entire exhaust gas from the second low-pressure turbine by a dry condensing system.

10. The method of claim 9, wherein the dry condensing system is of non-evaporative cooling and/or once through cooling type.

* * * * *